US010718957B2

(12) United States Patent
Wiemer et al.

(10) Patent No.: US 10,718,957 B2
(45) Date of Patent: Jul. 21, 2020

(54) EYE-MOUNTED DEVICE INCLUDING A FEMTOCAMERA AND FEMTOPROJECTOR

(71) Applicant: Spy Eye, LLC, Los Gatos, CA (US)

(72) Inventors: Michael West Wiemer, San Jose, CA (US); Kuang-mon Ashley Tuan, Mountain View, CA (US)

(73) Assignee: Tectus Corporation, Saratoga, CA (US)

( * ) Notice: Subject to any disclaimer, the term of this patent is extended or adjusted under 35 U.S.C. 154(b) by 192 days.

(21) Appl. No.: 15/886,398

(22) Filed: Feb. 1, 2018

(65) Prior Publication Data

US 2019/0235276 A1    Aug. 1, 2019

(51) Int. Cl.
*G02C 7/04*      (2006.01)
*G02C 11/00*     (2006.01)
*G02B 27/01*     (2006.01)
*G02C 7/08*      (2006.01)

(52) U.S. Cl.
CPC ............ *G02C 7/04* (2013.01); *G02C 7/081* (2013.01); *G02C 7/083* (2013.01); *G02C 11/10* (2013.01); *G02B 2027/0138* (2013.01)

(58) Field of Classification Search
CPC .......... G02C 7/04; G02C 7/081; G02C 7/083; G02C 11/10; G02B 2027/0138; G02B 2027/014
USPC ................................ 351/158, 159.03, 159.39
See application file for complete search history.

(56) References Cited

U.S. PATENT DOCUMENTS

| 4,871,247 A | 10/1989 | Haynes |
| 7,431,458 B2 | 10/2008 | Jongsma et al. |
| 7,542,210 B2 | 6/2009 | Chirieleison, Sr. |
| 7,626,562 B2 * | 12/2009 | Iwasaki ............... G02B 27/017 345/8 |
| 8,430,310 B1 | 4/2013 | Ho et al. |

(Continued)

FOREIGN PATENT DOCUMENTS

| WO | WO 2006/015315 A2 | 2/2006 |
| WO | WO-2006015315 A2 * | 2/2006 ........... G02B 27/017 |

OTHER PUBLICATIONS

Lingley et al., "A single-pixel wireless contact lens display," J. Micromech. Microeng. 21 125014. (Year: 2011).*

(Continued)

*Primary Examiner* — Nicholas R. Pasko
(74) *Attorney, Agent, or Firm* — Fenwick & West LLP (57) ABSTRACT

An eye-mounted device includes a contact lens, a femtocamera, and a femtoprojector. The femtocamera and femtoprojector are both contained in the contact lens. The femtocamera detects imagery of a user's surrounding environment, and the femtoprojector projects corresponding imagery to the user's retina. A line of sight of the femtocamera and a line of projection of the femtoprojector can be parallel to, or even collinear with, each other. Imagery signal paths from the femtocamera to the femtoprojector are also contained in the contact lens. In some embodiments, the imagery signal paths are register-less and asynchronous. The eye-mounted device can include other components, such as image processing circuitry. Also, the eye-mounted device can communicate with another device worn by the user, e.g., in a necklace or a headpiece.

20 Claims, 10 Drawing Sheets

(56) References Cited

U.S. PATENT DOCUMENTS

| | | | |
|---|---|---|---|
| 8,446,341 B2* | 5/2013 | Amirparviz | A61B 5/1455 250/221 |
| 8,786,675 B2* | 7/2014 | Deering | G09G 3/02 348/46 |
| 9,028,068 B2 | 5/2015 | Chang | |
| 9,040,923 B2 | 5/2015 | Sprague et al. | |
| 9,111,473 B1 | 8/2015 | Ho et al. | |
| 9,837,052 B2 | 12/2017 | Deering | |
| 2011/0221659 A1 | 9/2011 | King, III et al. | |
| 2014/0098226 A1* | 4/2014 | Pletcher | H04N 7/18 348/143 |
| 2014/0243971 A1* | 8/2014 | Pugh | A61F 2/1624 623/6.22 |
| 2014/0268029 A1* | 9/2014 | Pugh | G02C 7/04 351/159.39 |
| 2015/0049004 A1* | 2/2015 | Deering | G09G 3/02 345/8 |
| 2015/0261294 A1* | 9/2015 | Urbach | G06F 3/013 345/156 |
| 2015/0301338 A1* | 10/2015 | Van Heugten | G02C 7/04 345/8 |
| 2015/0312560 A1* | 10/2015 | Deering | G02B 13/0085 345/1.3 |
| 2016/0091737 A1* | 3/2016 | Kim | G02C 7/04 351/158 |
| 2016/0097940 A1* | 4/2016 | Sako | G02C 7/101 351/158 |
| 2016/0299357 A1* | 10/2016 | Hayashi | G02C 7/101 |
| 2017/0111619 A1* | 4/2017 | Benosman | A61B 5/6821 |
| 2017/0116897 A1* | 4/2017 | Ahn | G09G 3/002 |
| 2019/0025607 A1* | 1/2019 | Liao | G02C 7/04 |
| 2019/0025608 A1* | 1/2019 | Liao | G02C 7/04 |
| 2019/0250432 A1* | 8/2019 | Kim | G02C 7/04 |

OTHER PUBLICATIONS

Lu, J. et al., "A 1 TOPS/W Analog Deep Machine-Learning Engine With Floating-Gate Storage in 0.13 μm CMOS," IEEE Journal of Solid-State Circuits, Jan. 2015, pp. 270-281, vol. 50, No. 1.

Ioannou, S. et al., "Proximity and Gaze Influences Facial Temperature: A Thermal Infrared Imaging Study," Frontiers in Psychology, Aug. 2014, pp. 1-12, vol. 5, Article 845.

Kim, J. et al., "3D Multi-Spectrum Sensor System with Face Recognition," Sensors, 2013, pp. 12804-12829, vol. 13.

Liu, Y. et al., "Facial Expression Recognition with Fusion Features Extracted from Salient Facial Areas," Sensors, 2017, pp. 1-18, vol. 17, No. 712.

Merla, A., "Thermal Expression of Intersubjectivity Offers New Possibilities to Human-Machine and Technologically Mediated Interactions," Frontiers in Psychology, Jul. 2014, pp. 1-6, vol. 5, Article 802.

International Search Report and Written Opinion for Application No. PCT/US2019/015338, dated Apr. 11, 2019, 15 pages.

ITMO University. New femto-camera with quadrillion fractions of a second resolution. Eureka Alert. Jun. 21, 2017. [Retrieved Mar. 18, 2019]. Retrieved from: https://www.eurekalert.org/pub_releases/2017-06/iu-nfw062117.php> entire document (3 pages).

\* cited by examiner

EYE-MOUNTED DEVICE INCLUDING A FEMTOCAMERA AND FEMTOPROJECTOR

BACKGROUND

1. Technical Field

This disclosure relates generally to an eye-mounted device.

2. Description of Related Art

Eye-mounted devices can be used for virtual reality (VR) applications and also for augmented reality (AR) applications. In VR applications, the images projected by the eye-mounted device replace what the user would normally see as his external environment. In AR applications, the images projected by the eye-mounted device augment what the user would normally see as his external environment, for example they may appear as overlays on the external environment.

Head-mounted displays have also been proposed for these types of applications. Capturing image data by and communicating image data to head-mounted displays is a different problem than for eye-mounted displays, because head-mounted displays can be larger in size, they have access to more power and they can receive data over wired transmission. In contrast, eye-mounted devices present unique challenges because of their size and location mounted on the eye.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

An eye-mounted device includes a contact lens, a femtocamera, and corresponding femtoprojector. The femtocamera and femtoprojector are both contained in the contact lens. The femtocamera detects imagery of a user's surrounding environment. In various embodiments, the femtocamera operates in a visible wavelength band, a non-visible wavelength band, or a combination of both. Imagery captured by the femtocamera is transmitted (possibly with some processing) to the femtoprojector via signal paths that are contained in the contact lens. These imagery signal paths preferably are register-less and asynchronous in order reduce latency and power consumption. The imagery can be transmitted using analog signals. The femtoprojector then projects corresponding imagery to the user's retina.

Because the femtocamera and femtoprojector are both contained in the contact lens, they maintain a constant position relative to each other and to the user's retina. As a result, certain embodiments can be implemented without eye tracking and/or without transmitting the imagery outside the contact lens.

Electronics for the femtocamera and femtoprojector can be implemented on a single die. In an example design, the femtocamera and femtoprojector are stacked on each other. In another example design, the femtocamera and femtoprojector are arranged side-by-side to each other. A line of sight of the femtocamera can be parallel to, or even collinear with, a line of projection of the femtoprojector.

In some embodiments, the eye-mounted device additionally includes image processing circuitry that processes the imagery detected by the femtocamera. Examples include edge enhancement, motion detection, and temperature estimation (for thermal infrared femtocameras). The eye-mounted device can also include trigger circuitry that causes the femtocamera to detect imagery upon detection of a trigger. Examples of triggers include a predetermined sequence of eye blinking, recognition of an external image, and recognition of a pattern (e.g., a Quick Response code). The eye-mounted device may further include a wireless transmitter that facilitates communication of the eye-mounted device with other devices, such as a device worn by the user in a necklace or a headpiece.

Figure 1:
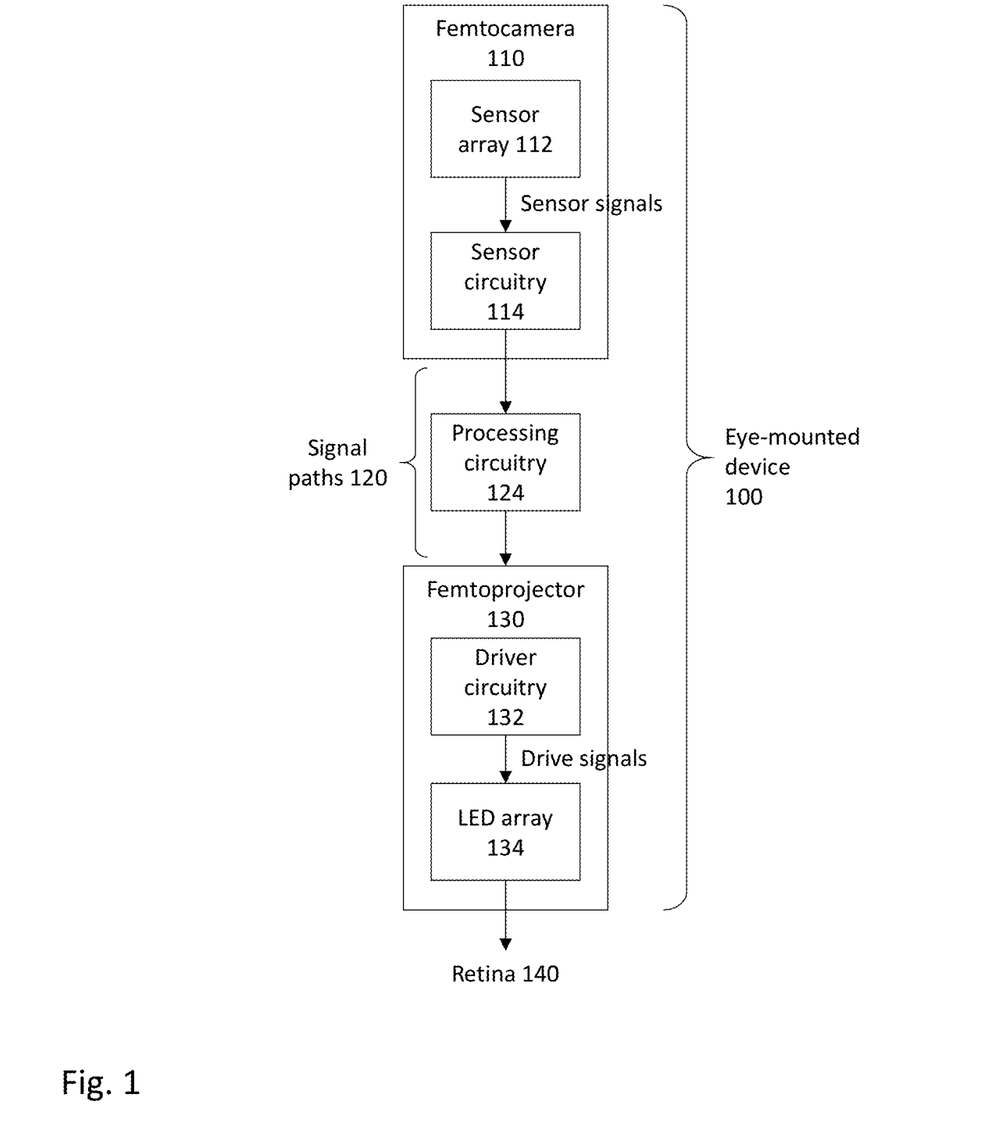
FIG. 1 is a block diagram of an eye-mounted device with a femtocamera and a femtoprojector.

In more detail, FIG. 1 is a block diagram of an eye-mounted device 100 that includes a femtocamera 110 and a femtoprojector 130. The eye-mounted device 110 optionally also includes image processing circuitry 124. Signal paths 120 transmit imagery from the femtocamera 110 through the processing circuitry 124 to the femtoprojector 130. The eye-mounted device 100 also includes a contact lens (not shown in FIG. 1) that contains the femtocamera 110, the imagery signal paths 120, the processing circuitry 124, and the femtoprojector 130. In some embodiments, functions of the image processing circuitry 124 are performed by components mounted in a necklace or headpiece communicating with the eye-mounted display 100.

The femtocamera 110 detects imagery of a user's surrounding environment in a field of view of the femtocamera 110. The field of view of the femtocamera 110 can be the same, smaller or larger than a field view of the user's eye. The femtocamera 110 includes imaging optics (not shown), a sensor array 112 and a sensor circuitry 114. The sensor array 112 is an array of photodiodes. In some embodiments, the sensor array 112 operates in a visible wavelength band (i.e., ~390 nm to 770 nm). Alternatively or additionally, the sensor array 112 operates in a non-visible wavelength band, such as an infrared (IR) band (i.e., ~750 nm to 10 µm) or an ultraviolet band (i.e., <390 nm). For example, the sensor array 112 may be a thermal infrared sensor.

The sensor circuitry 114 is configured to sense and condition sensor signals produced by the sensor array 112. In some instances, the output signals produced by the sensor circuitry 114 are analog signals. Alternatively, the sensor circuitry 114 may include analog-to-digital converters (ADC), so that the output signals are digital rather than analog. The sensor circuitry 114 can also have other functions. For example, the sensor circuitry 114 may amplify the sensor signals, convert them from current to voltage signals or filter noise from the sensor signals to keep a signal-to-noise ratio below a threshold value.

The imagery signals are sent along signal paths 120 from the sensor circuitry 114 through the processing circuitry 124 to driver circuitry 132 of the femtoprojector 130. The imagery signal paths 120 can be analog signal paths, digital signal paths, or a combination of both. The imagery signal paths 120 can be register-less signal paths, meaning no data registers are used to store data along the signal paths. Thus, there are no memories or buffers along the imagery signal paths 120. In some embodiments, the imagery signal paths 120 are asynchronous signal paths that are not timed by a clock circuit or clock signals. Accordingly, imagery signals from the femtocamera 110 produce corresponding imagery projected by the femtoprojector 130 with a latency determined only by the propagation delay through the signal paths 120. In addition, the integration time of the sensor array determines minimum light level requirements or maximum tolerable light level before saturation occurs.

The image processing circuitry 124 processes the imagery signals from the femtocamera 110. In some embodiments, the processing circuitry 124 is analog circuitry. The processing circuitry 124 can perform various types of image processing. A type of image processing is edge enhancement, where the processing circuitry 124 identifies edge boundaries in the imagery signals and increases a contrast around the identified edge boundaries. Consequently, the edge boundaries will look more defined when projected to the user. Another type of processing is motion detection. For example, the processing circuitry 124 identifies an object located in the surrounding environment and detects a change in position of the object relative to its surrounding. The processing circuitry 124 can also process the imagery signals to estimate a temperature of the surrounding environment or a temperature of an object therein. For example, in instances where the femtocamera 110 operates in a thermal IR band, the processing circuitry 124 estimates a temperature based on thermal IR imagery detected by the femtocamera 110. In addition to the examples described above, the processing circuitry 124 can perform other types of image processing. The imagery signals are further transmitted from the processing circuitry 124 to the femtoprojector 130 through the imagery signal paths 120.

The femtoprojector 130 projects imagery corresponding to the imagery detected by the femtocamera 110 to the user's retina 140. The imagery projected by the femtoprojector 130 is visible to the user's retina 140 because the femtoprojector 130 operates at a visible wavelength band, regardless of whether the femtocamera 110 operates in a visible wavelength band or a non-visible wavelength band. The femtoprojector 130 includes driver circuitry 132 and an LED (light emitting diode) array 134. In one approach, the driver circuitry 132 and LED array 134 are manufactured separately and later bonded together to form electrical connections. Alternately, they can be integrated on a single common substrate. In some embodiments, the driver circuitry 132 and the LED array 134 are implemented on separate planes of the femtoprojector 130. For example, the driver circuitry 132 is implemented on a backplane that is further from the retina 140 and the LED array 134 is implemented on a frontplane that is closer to the retina 140.

The driver circuitry 132 receives imagery signals from the processing circuitry 124 and converts these to drive signals to drive the LED array 134 (e.g., drive currents for LEDs). In some embodiments, the driver circuitry 132 enhances the imagery detected by the femtocamera 110, e.g., by amplifying the imagery signals. To save power, the driver circuitry 132 and LED array 134 may power down when no imagery signals are received. If the imagery signals are clocked data packets, the no signal situation may be detected when there is no clock present, for example if there is no clock signal on clock input pins or if no clock can be recovered from the incoming data stream. Also, the drive signals produced by the driver circuitry 132 may not be persistent. That is, the drive signals cause a corresponding subset of LEDs of the LED array 134 to produce light, but only when the drive signals are applied. Once the backplane no longer produces those drive signals, those LEDs also cease to produce light. In an example design, the driver circuitry 132 is an application specific integrated circuit (ASIC).

The LED array 134 contains an array of LEDs that produce light according to the drive signals from the driver circuitry 132, thus generating imagery corresponding to the imagery detected by the femtocamera 110. The array of light emitters 134 can have different geometries. One example geometry is a rectangular array of LEDs. Another example geometry is a hexagonal array of LEDs. The LEDs in aggregate project light to portions of the retina that in aggregate span a certain field of view. The portion of the retina is fixed as the user's eye rotates in its socket. Thus, the LEDs forms a visual sensation of the imagery. Preferably, the light from the LEDs are projected onto the retina with pixel resolutions that are highest for pixels projected to a foveal section of the retina and lower for other sections (e.g., peripheral sections) of the retina.

In some embodiments, electronics and circuitry of the femtocamera 110, the processing circuitry 124, and the femtoprojector 230 are implemented on a single die. Signal paths between the three components of the system can be register-less signal paths. No buffer is necessary. In alternate embodiments, buffers may be included.

In some embodiments, the femtocamera 110 is regularly calibrated. In an example design, the femtocamera 110 runs a calibration cycle when the user's eyelid is closed. In the example design, the eye lid functions as a shutter to the femtocamera 110.

The femtocamera 110 has a line of sight. The line of sight indicates an orientation along which the femtocamera 110 detects imagery. The femtoprojector 130 has a line of projection, indicating an orientation along which the femtoprojector 130 projects corresponding imagery to the user's retina 140. Depending on how the femtocamera 110 and the femtoprojector 130 are arranged, the line of sight of the femtocamera 110 may be parallel or not parallel to the line of projection of the femtoprojector 130. In instances where the line of sight is parallel to the line of projection, the line of projection may be collinear with the line of sight. The femtocamera 110 and the femtoprojector 130 may have the same field of view and spatial resolution.

Figure 2A:
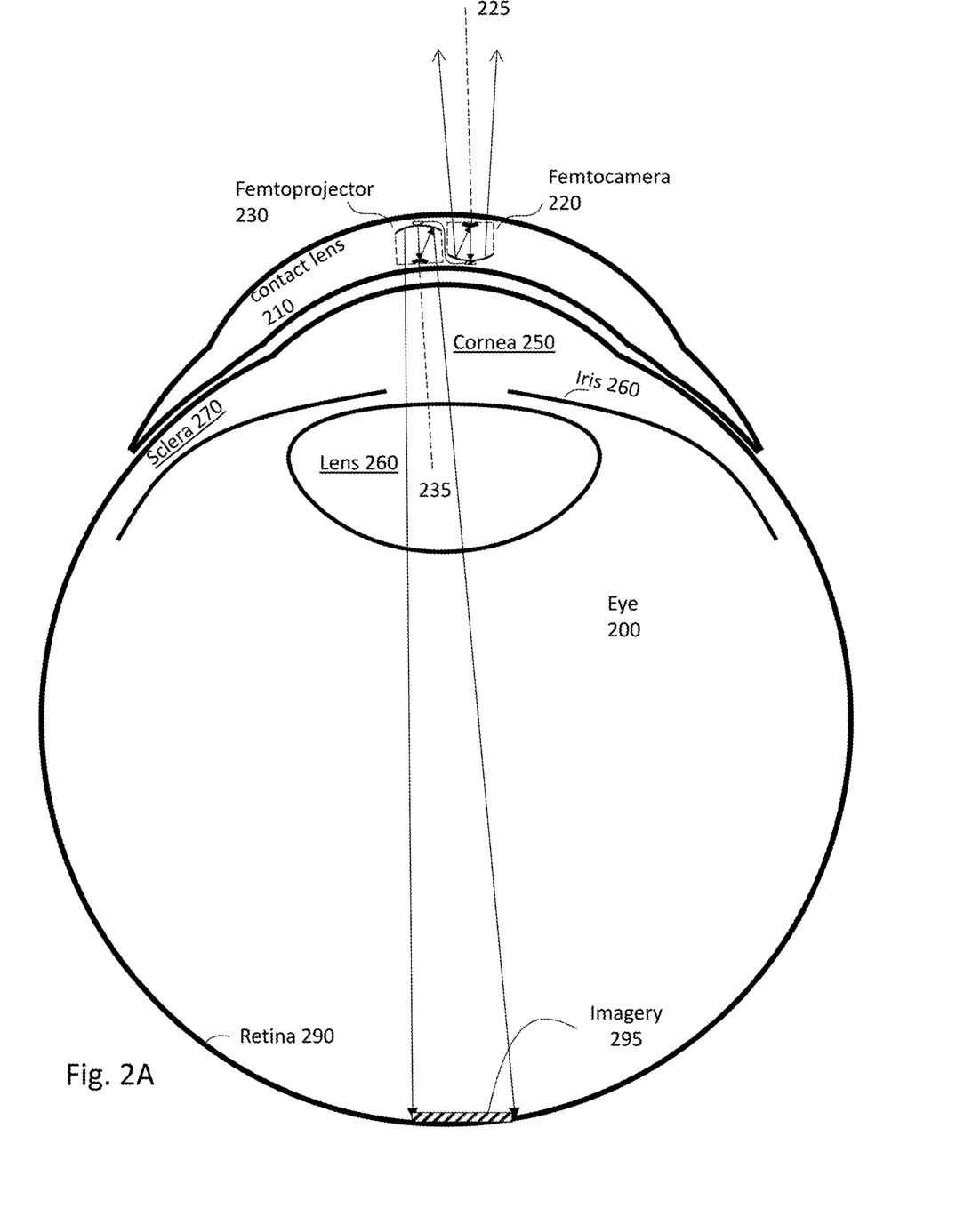
FIG. 2A shows a cross sectional view of a contact lens with a femtocamera and femtoprojector arranged side-by-side to each other.

For example, FIG. 2A shows a cross sectional view of a contact lens 210 of an eye-mounted device, where a femtocamera 220 and a femtoprojector 230 are arranged side-by-side to each other. FIG. 2A shows an embodiment using a scleral contact lens but the contact lens 210 does not have to be scleral. The contact lens 210 is separated from the cornea 250 of the user's eye 200 by a tear layer. Over the cornea 250, the tear layer may be as thick as a hundred microns or more while it may be only a few microns thick over the sclera 270. The aqueous of the eyeball is located between the cornea and the crystalline lens 280 of the eye 200. The vitreous fills most of the eyeball including the volume between the intraocular lens 280 and the retina 290. The iris 260 limits the aperture of the eye.

The contact lens 210 preferably has a thickness that is less than two mm. Each of the femtocamera 220 and the femtoprojector 230 preferably fits in a 2 mm by 2 mm by 2 mm volume. The contact lens 210 is comfortable to wear and maintains eye health by permitting oxygen to reach the cornea 250.

As shown in FIG. 2A, the femtocamera 220 is an outward-facing camera, meaning the femtocamera 220 "looks" away from the eye 200 and detects imagery of a surrounding environment, including an area that the eye 200 is looking at. The femtoprojector 230 is an inward-facing projector—it projects imagery 295 onto the retina 290. The optical path from the femtoprojector 230 to the imagery 295 on the retina 290 does not include any air gaps, although this is not required. If there are no air gaps, the femtoprojector 230 embedded in contact lens 210 will be insensitive to the air-cornea interface that provides most of the focusing power in an unaided eye and the system will not be affected by variations in cornea shape that occur from one person to another.

In FIG. 2A, the femtocamera 220 has a line of sight 225 and the femtoprojector 230 has a line of projection 235. The line of sight 225 is parallel to the line of projection 235. However, the line of sight 225 is not collinear to the line of projection 235. Given the small size of the contact lens 210, offset between the line of projection and line of sight is small. Even though the line of sight is not strictly parallel to the gaze direction of the eye, imagery detected by the femtocamera 220 can still include imagery that falls within the eye's natural field of view.

Figure 2B:
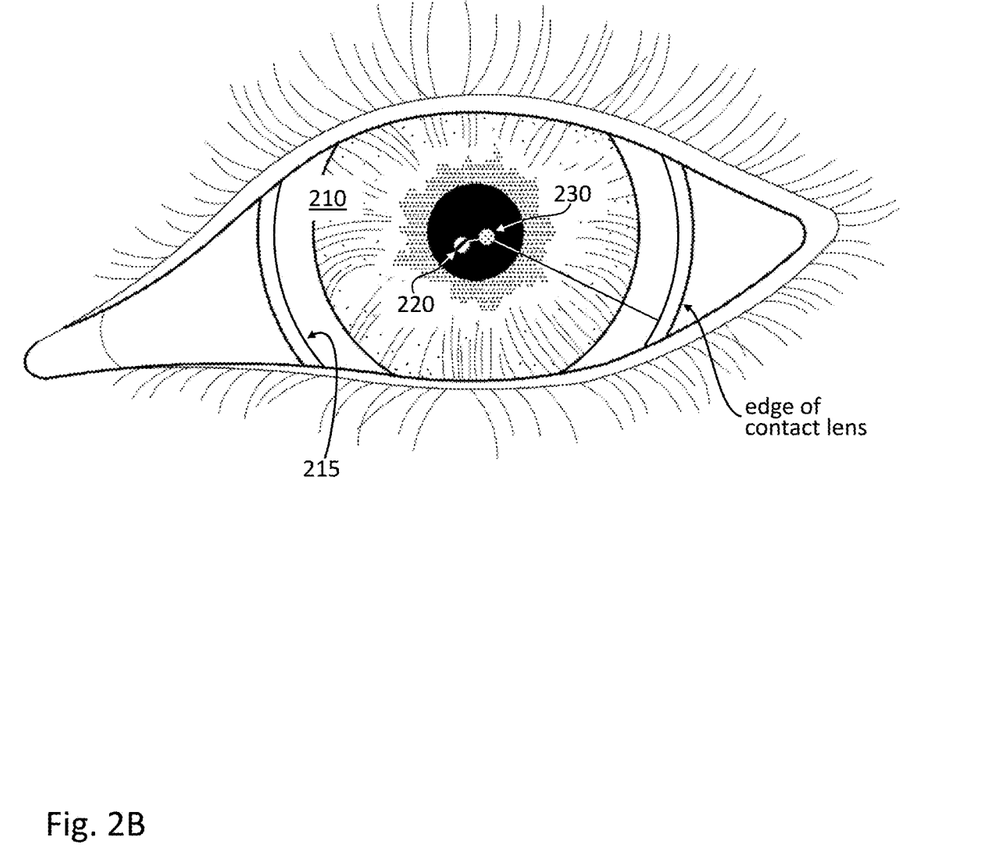
FIG. 2B shows a view of the contact lens device mounted on a user's eye.

FIG. 2B shows a front view of the contact lens 210 mounted on a user's eye 200. The contact lens 210 is placed on the surface of the eye 200. The contact lens 210 moves with the user's eye 200 as the user's eye rotates in its sockets. Because the femtocamera 220 and femtoprojector 230 are both mounted in the contact lens 210, they also move with the user's eye. The contact lens 210 includes a coil 215. In some embodiments, the coil 215 is a power coil that transfers power from an external power supply (e.g., a battery) to the femtocamera 220 and femtoprojector 230 contained in the contact lens. The coil 215 receives the power from the external power supply wirelessly, e.g., via magnetic induction. In some other embodiments, the contact lens 210 includes a battery that supplies power to the femtocamera 220 and femtoprojector 230.

Figure 2C:
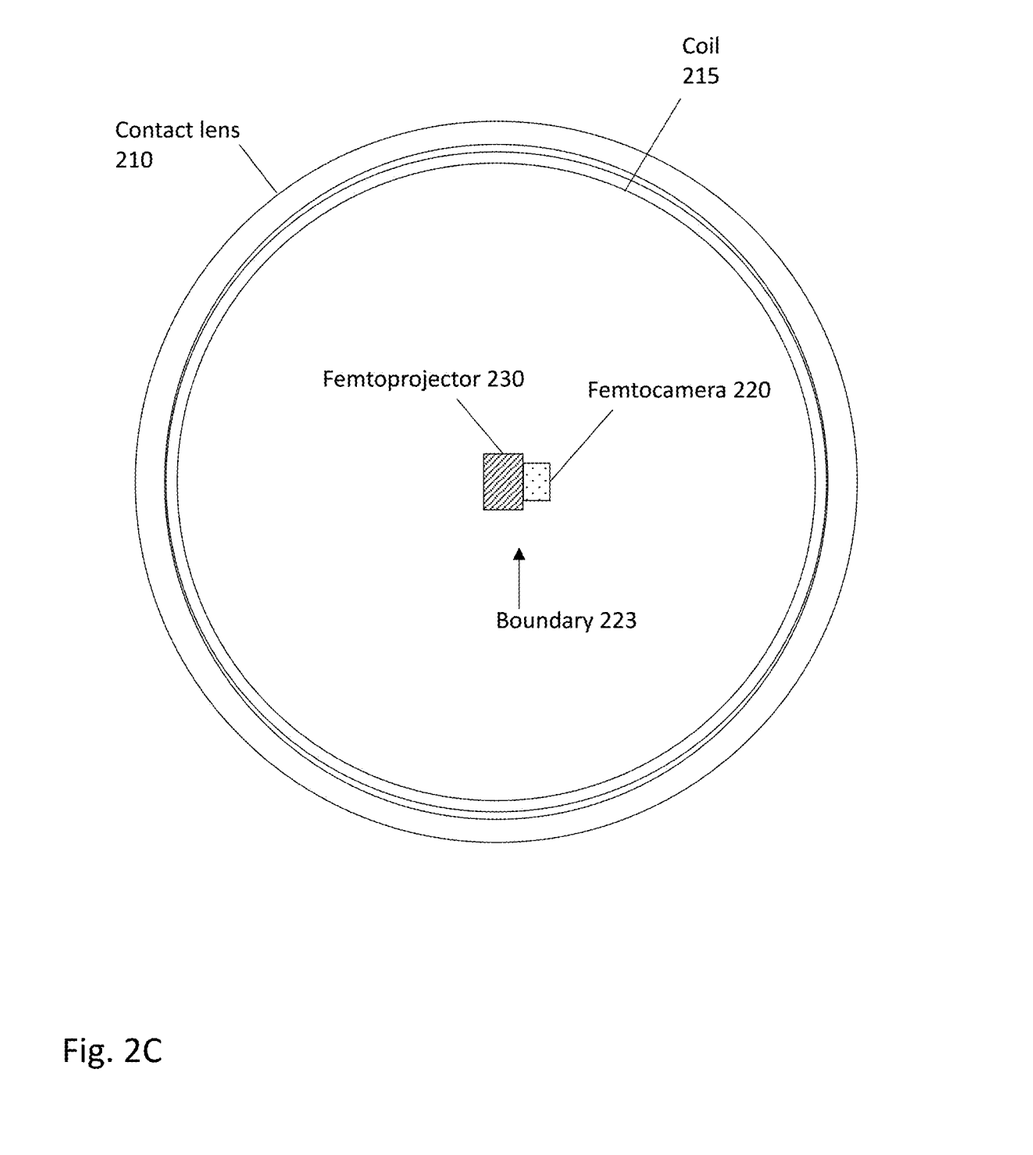
FIG. 2C shows a plan view of the contact lens device.

FIG. 2C shows a plan view of the contact lens 210. This plan view is taken looking at the femtocamera 220 and femtoprojector 230 from the top of FIG. 2A. The ratio of the contact lens diameter to femtoprojector lateral size is preferably roughly 25:1 for the largest femtoprojector. This ratio is normally between about 15:1 and 30:1, but may be as small as 5:1 or as large as 50:1.

As shown in FIG. 2C, the femtocamera 220 and the femtoprojector 230 are arranged side-by-side to each other, forming a boundary 223. Imagery signals produced by the femtocamera 220 can be sent to the femtoprojector 230 across the boundary 223. Alternatively, the contact lens 210 contains an interposer coupled between the femtocamera 220 and femtoprojector 230. The interposer provides signal paths between the femtocamera 220 and femtoprojector 230.

FIG. 2C shows one femtocamera 220 and one femtoprojector 240 in the contact lens 210, but multiple femtoprojectors 230 may be mounted in such a lens and coupled to the femtocamera 220. The multiple femtoprojectors 230 in aggregate project imagery to the user's retina that corresponds to the imagery detected by the femtocamera 220. Different femtoprojectors 230 can have different sizes. The contact lens may also contain multiple femtocameras.

Figure 3:
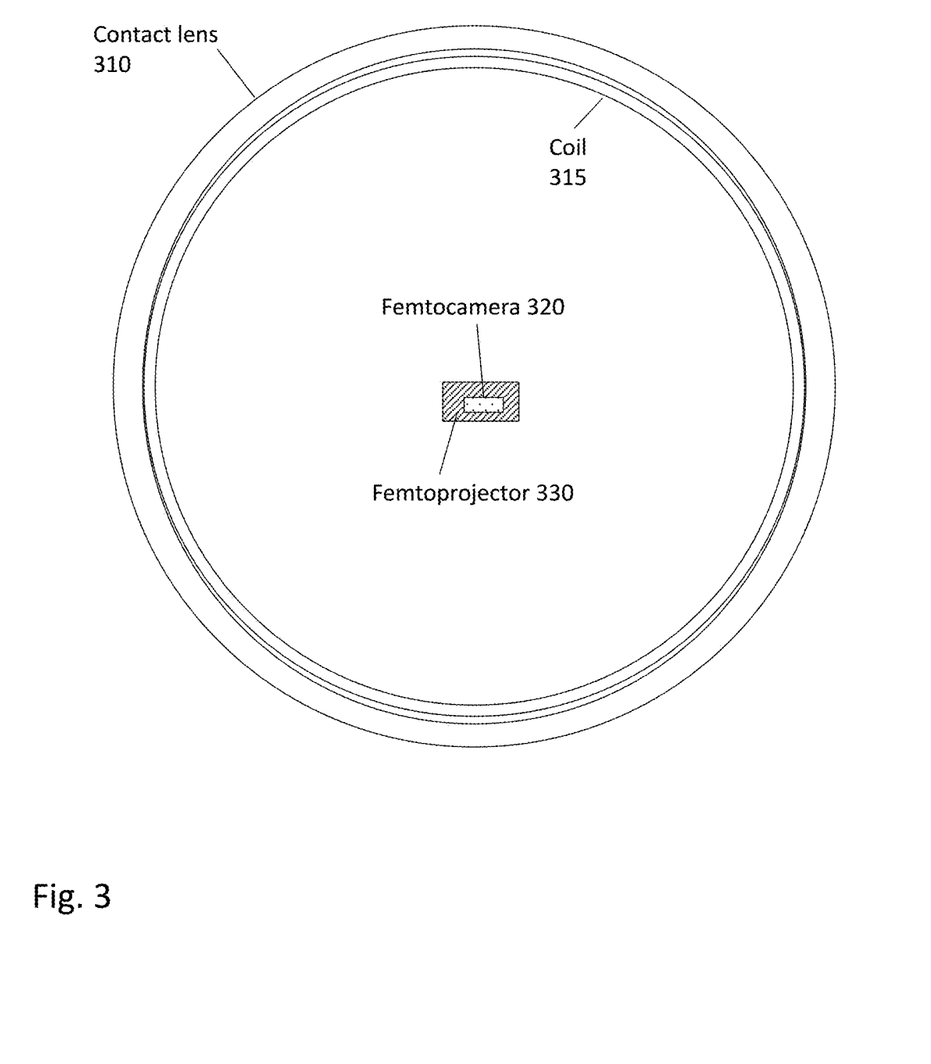
FIG. 3 shows a plan view of a contact lens with a femtocamera and femtoprojector stacked on each other.

Showing a different configuration from FIG. 2C, FIG. 3 shows a plan view of a contact lens 310 of an eye-mounted device where a femtocamera 320 and a femtoprojector 330 are stacked on each other. For the purpose of illustration, the femtocamera 320 is smaller than the femtoprojector 330. In other embodiments, the femtocamera 320 can have different sizes relative to the femtoprojector 330. The femtocamera 320 is an outward-facing camera and has a line of sight pointing away from the eye. The femtoprojector 330 is an inward-facing projector and has a line of projection pointing toward the eye. Because the femtocamera 320 is stacked on top of the femtoprojector 330, the line of sight of the femtocamera 320 can be made collinear to the line of projection of the femtoprojector 330. Both can also be aligned to the gaze direction of the eye. Thus, in the design of FIG. 3, the femtocamera 320 captures imagery where the user is looking and the femtoprojector projects corresponding imagery to the user's retina.

The femtocamera and femtoprojector in FIGS. 2 and 3 can be implemented on a single die so that any data transmission is contained within the die. Thus, power consumption and latency are reduced.

Figure 4:
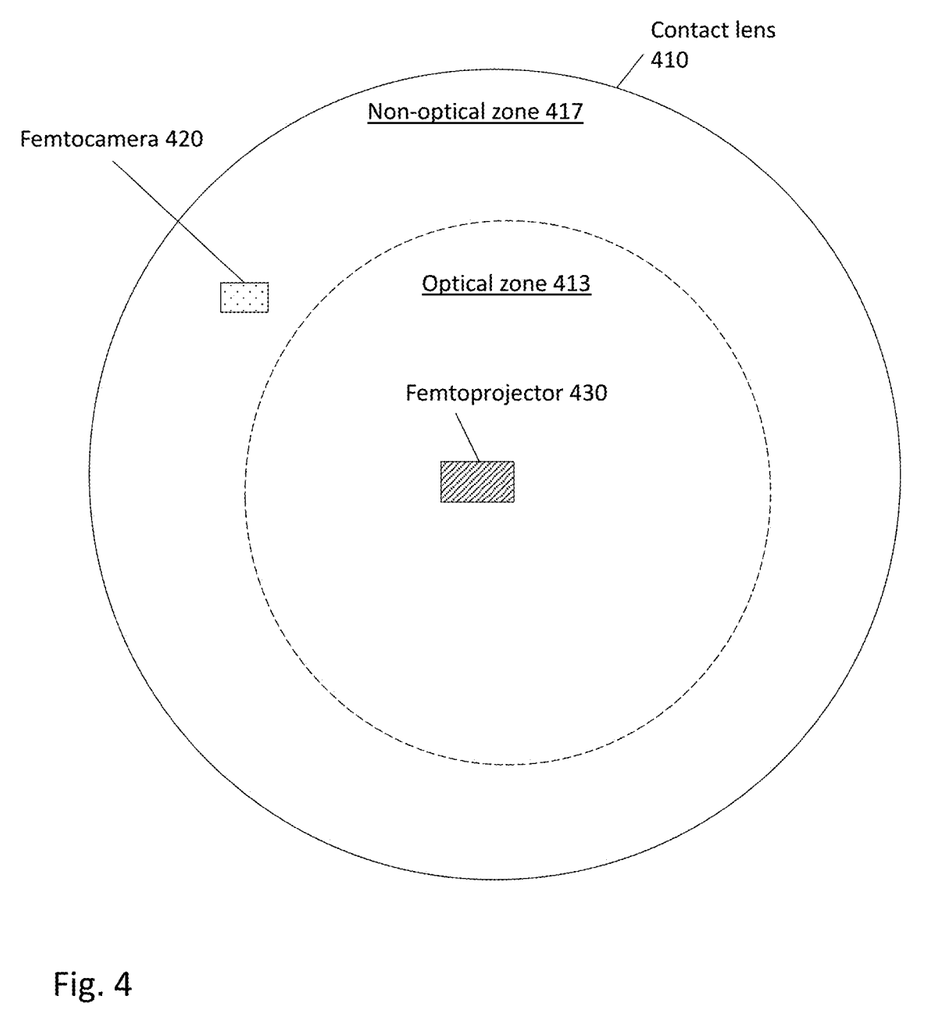
FIG. 4 shows a plan view of a contact lens with a femtocamera and a femtoprojector spaced apart from each other.

FIG. 4 shows another configuration, where a contact lens 410 of an eye-mounted device contains a femtocamera 420 and a femtoprojector 430 spaced apart from each other. The contact lens 410 is roughly divided by the dashed circle into an optical zone 413 and a non-optical zone 417. The femtocamera 420 is located in the non-optical zone 417, while the femtoprojector 430 is located in the optical zone 413. Components in the optical zone 413 (such as the femtoprojector 430) may be in the optical path of the eye, depending on how far open the iris is. Components in the non-optical zone 417 (such as the femtocamera 420) fall outside the aperture of the eye. Because the femtocamera 420 is not located in the optical zone 413, it does not block the view of the eye, which is useful in AR applications.

Because the femtocamera 420 is spaced apart from a femtoprojector 430, even if a line of projection of the femtoprojector 430 is parallel to a line of sight of the femtocamera 420, the two will be offset. However, the lateral offset is relatively small given the typical fields of view of an eye.

Even though not shown in FIGS. 2-4, a contact lens of an eye-mounted device can additionally contain processing circuitry, an example of which is the image processing circuitry 124 described in FIG. 1. Also, an eye-mounted device can include other components that are not shown in the eye-mounted device 100 of FIG. 1.

Figure 5A:
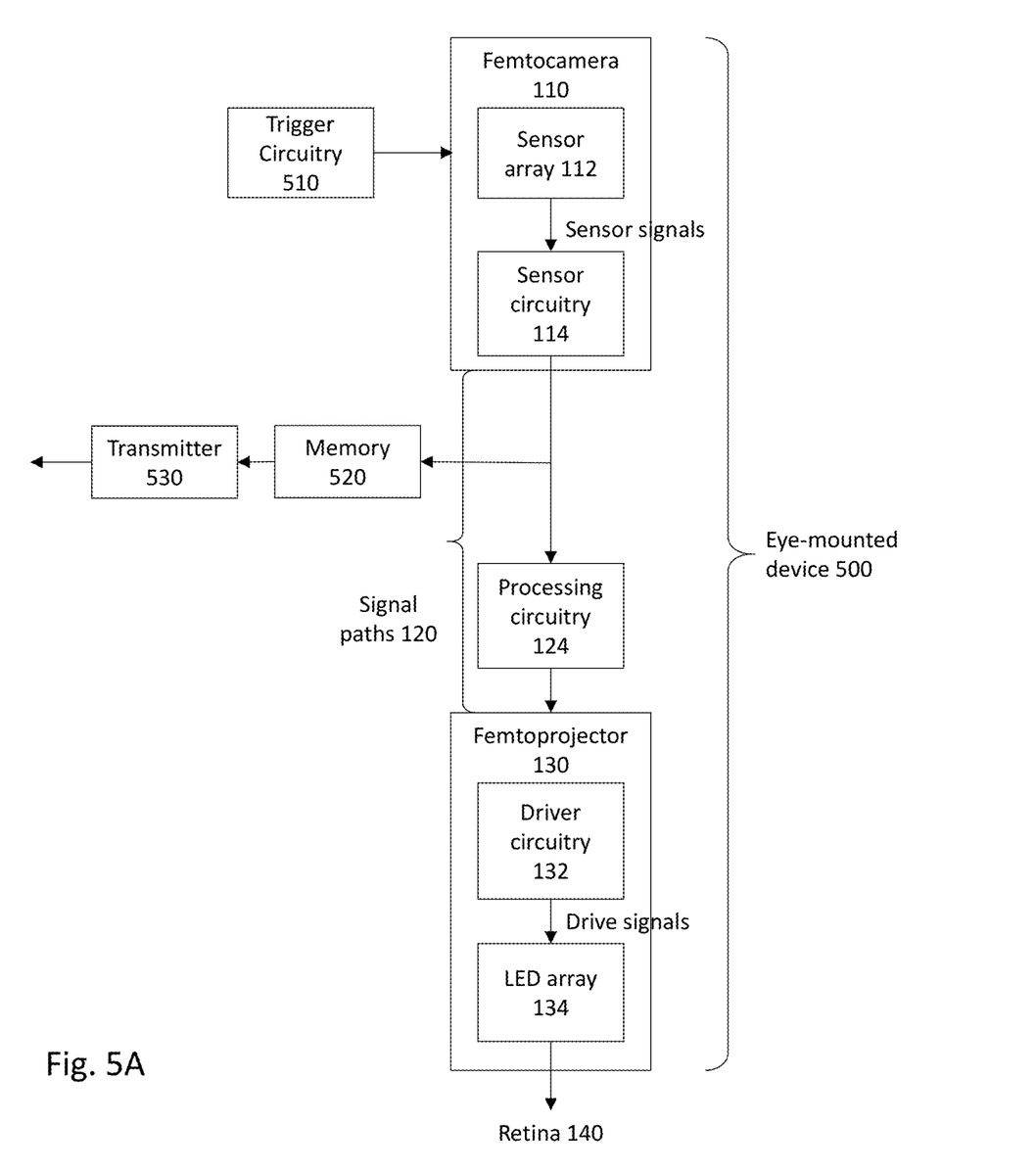
FIGS. 5A and 5B show block diagrams of other eye-mounted devices.

For example, FIG. 5A shows a block diagram of another eye-mounted device 500. In addition to the components of the eye-mounted device 100 described in FIG. 1, the eye-mounted device 500 includes trigger circuitry 510, a memory 520, and a wireless transmitter 530. The trigger circuitry 510, memory 520, and wireless transmitter 530 are also contained in the contact lens of the eye-mounted device 500.

The trigger circuitry 510 acts as a shutter to cause the femtocamera 110 to detect imagery upon detection of a trigger. An example trigger is a pre-determined sequence of eye blinking. For example, upon detection of three eye blinks in sequence (or within a predetermined amount of time), the trigger circuitry 510 triggers the femtocamera 110 to capture imagery of a user's surrounding environment. There can be other types of triggers, such as a user action performed on a component communicating with the eye-mounted device 500, change in lighting in the user's surrounding environment, recognition of an external image or pattern (e.g., a Quick Response code), and so on.

The memory 520 stores imagery signals produced by the femtocamera 110. In the example design of FIG. 5, the memory 520 stores the imagery signals before they are processed by the processing circuitry 124. In an alternative design, the memory 520 stores the imagery signals after they are processed by the processing circuitry 124. The wireless transmitter 530 transmits stored imagery off the contact lens. For example, the wireless transmitter 530 transmits imagery signals to a device external to the eye-mounted device.

If more sophisticated processing is desired, the wireless transmitter 530 may transmit imagery signals to an external component for further processing. In that case, the wireless transmitter 530 may also act as a receiver to receive the further processed imagery from the external device and transmit the imagery to the femtoprojector 130 for projecting to the user's retina 140.

Figure 5B:
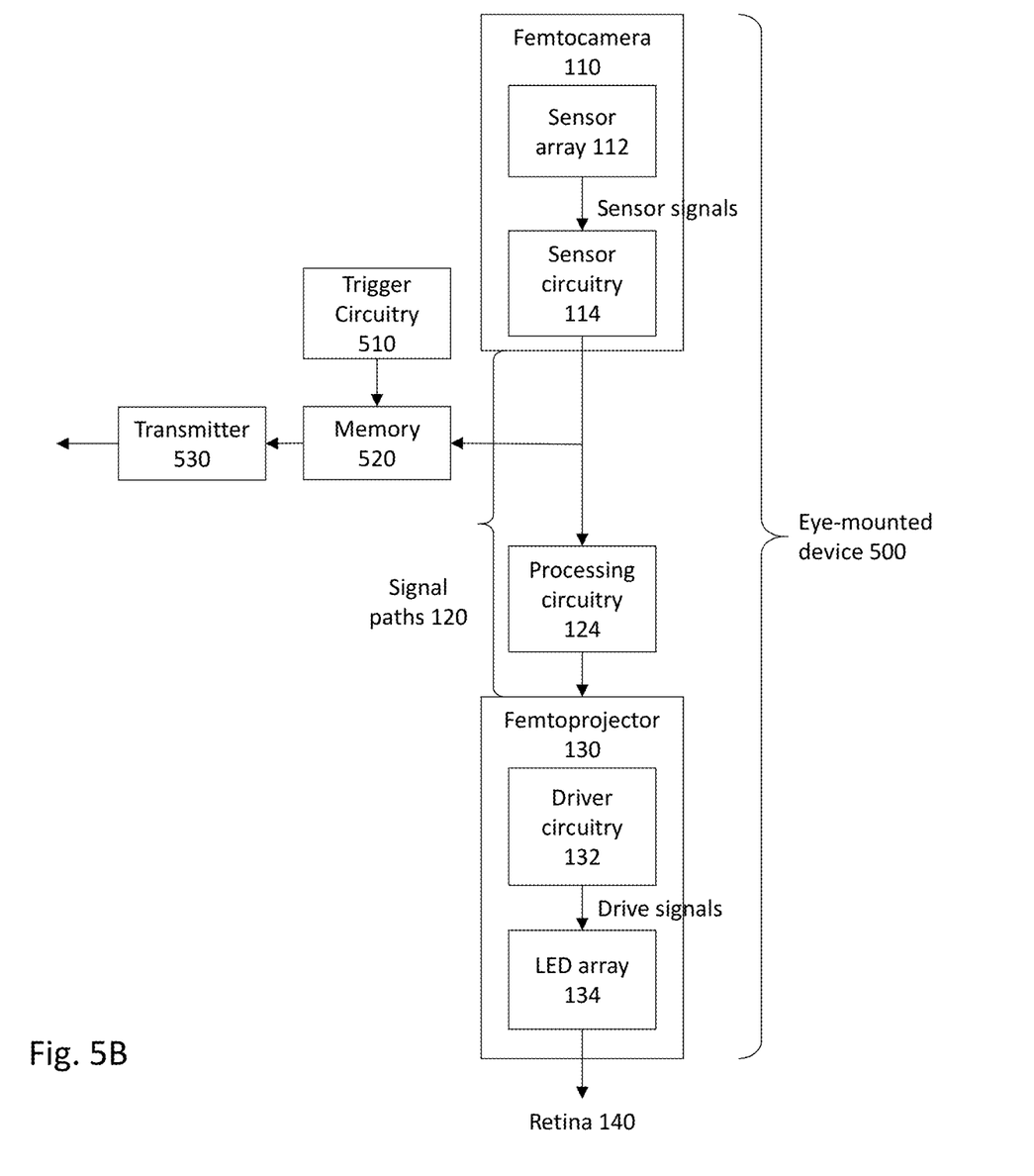

In FIG. 5B, the trigger circuitry 510 does not trigger the femtocamera 110. Rather, the femtocamera 110 is continuously operating but in a memory-less mode. That is, imagery flows asynchronously from the femtocamera 110 to the femtoprojector. If the user sees something of interest, he can record the imagery by triggering the trigger circuitry 510. Alternately, if the processing circuitry 124 detects a pattern of interest, the trigger circuitry 510 is triggered or the processing circuitry 124 may trigger the memory 520 directly. This records a snapshot of the imagery in memory 520, which can be transmitted off-device by the transmitter 530.

Even though not shown in FIG. 5, the eye-mounted device 500 can further include control circuitry contained in the contact lens. The control circuitry controls the femtocamera 110 and/or the femtoprojector 130 based on commands, e.g., eye blinking commands. For example, upon detection of three eye blinks in sequence, the control circuitry switches operation of the femtocamera 110 from a visible wavelength band to an IR band. Or upon detection of five eye blinks in sequence, the control circuitry triggers the femtoprojector 130 to project imagery to the user's retina 140.

The contact lens may also contain other components for power and/or positioning. Power components may include batteries for power storage. Positioning components may include accelerometers, gyroscopes, magnetometers, and fiducial or other structures used for eye tracking and head tracking.

In addition to the eye-mounted device, an overall system may also include other devices for functions that are hard to be achieved in the contact lens. These other device may be worn by the user on a belt, armband, wrist piece, necklace, headpiece, or other types of packs.

Figure 6:
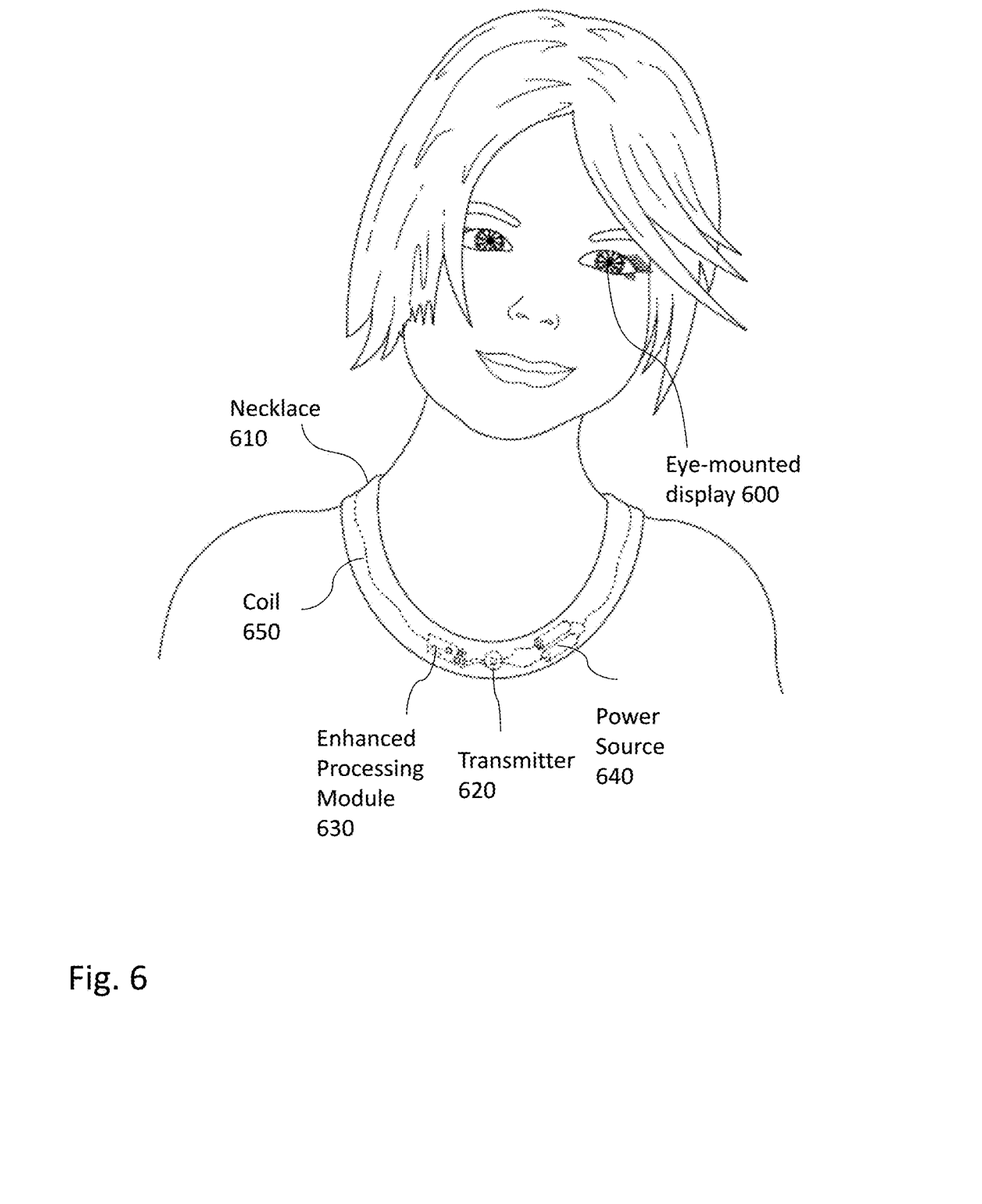
FIG. 6 shows a user wearing a necklace in communication with an eye-mounted device.

For example, FIG. 6 shows an implementation where, in addition to an eye-mounted display 600, the user is also wearing a necklace 610 that contains components communicating with an eye-mounted display 600. In this example, a necklace 610 includes a transceiver 620, an enhanced processing module 630, a power source 640, and a coil 650. These components of the necklace 610 are shown with broken lines in FIG. 6 because they are placed inside the necklace and not visible from outside. These components can be located at other positions in the necklace 610 than their positions shown in FIG. 6. The necklace 610 may also communicate with cloud services or other remote processing.

The transceiver 620 facilitates communication between the necklace 610 with the eye-mounted device 600. An embodiment of the eye-mounted device 600 is the eye-mounted device 500 in FIG. 5. The transceiver 620 receives imagery signals from the eye-mounted device 600 and sends the imagery signals to the enhanced processing module 630. Similarly, the transceiver 620 can send signals from the enhanced processing module 630 back to the eye-mounted device 600.

The enhanced processing module 630 performs imaging processing not performed by the processing circuitry of the eye-mounted device 600. For example, the enhanced processing module 630 identifies an object (e.g., a person, a structure, an animal, etc.) located in the surrounding environment, e.g., by inputting the received imagery signals into a machine learning model trained for identifying objects. The machine learning model can be trained by enhanced processing module 630 or trained in a central system and loaded onto the enhanced processing module 630. Alternatively or additionally, the enhanced processing module 630 can identify facial features, detect emotions, track an object, or perform other types of imaging processing. In instances where the eye-mounted device 600 does not include processing circuitry, the enhanced processing module 630 performs the imaging processing performed by the processing circuitry 124 described in FIG. 1. For example, imagery signals captured by the femtocamera are transmitted from the eye-mounted device 600 to the enhanced processing module 630. The enhanced processing module 630 processes the imagery signals on the necklace 610. The processed imagery signals are returned to the eye-mounted device 600 for display by the femtoprojector. In one embodiment, the processing is performed by cloud services that are accessible by the necklace 610.

The power source 640 supplies power to the necklace 610 and the eye-mounted display 600. The coil 650 is a power coil that transfers power from the power source 640 to the eye-mounted device 600, e.g., by using a coil contained in a contact lens of the eye-mounted device 600. The coil 650 receives the power from the external power supply wirelessly, e.g., via magnetic induction. The necklace 610 can include other components, e.g., an audio module to play audio signals to the user. The audio signals can be generated based on the imagery received from the eye-mounted device 600 or received from other sources.

Figure 7:
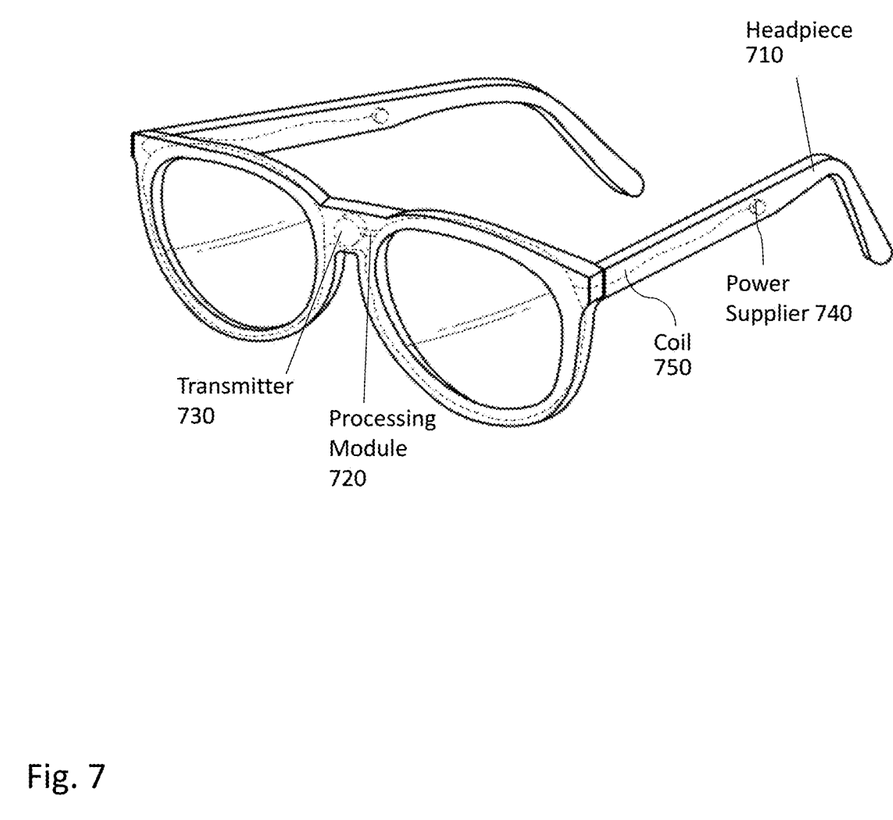
FIG. 7 shows a headpiece configured to communicate with an eye-mounted device.

FIG. 7 shows another implementation where a headpiece 710 contains components communicating with the eye-mounted display 600. The components contained in the headpiece 700 are similar to the components contained in the necklace 610 in FIG. 6. Because the headpiece 710 is closer to the eye-mounted device 600 when they are worn by the user, data transmission with the eye-mounted display 600 has higher bit rate and consumes less power. The headpiece 710 may include different components than those shown in FIG. 7. For example, the headpiece 710 can include a camera that captures image data of a surrounding environment of the user.

In the example design of FIG. 7, the headpiece 710 is a pair of glasses. In other designs, the headpiece 710 can have other configurations. For example, the headpiece 710 could be a helmet or goggles.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. An eye-mounted device comprising:
    a contact lens;
    a femtocamera and a corresponding femtoprojector both contained in the contact lens, the femtocamera oriented to detect imagery of a user's surrounding environment, the femtoprojector projecting corresponding imagery to the user's retina; and
    memory-less imagery signal paths from the femtocamera to the femtoprojector, the imagery signal paths also contained in the contact lens.

2. The eye-mounted device of claim 1, wherein the imagery signal paths are register-less signal paths.

3. The eye-mounted device of claim 1, wherein the imagery signal paths are analog signal paths.

4. The eye-mounted device of claim 1, wherein the imagery signal paths are asynchronous signal paths.

5. The eye-mounted device of claim 1, wherein the femtocamera detects imagery along a line of sight, and the femtoprojector projects imagery along a line of projection that is parallel to the line of sight.

6. The eye-mounted device of claim 1, wherein the femtocamera detects imagery along a line of sight, and the femtoprojector projects imagery along a line of projection that is not parallel to the line of sight.

7. The eye-mounted device of claim 1, wherein the femtocamera and femtoprojector are stacked on each other.

8. The eye-mounted device of claim 1, wherein the femtocamera and femtoprojector are arranged side-by-side to each other.

9. The eye-mounted device of claim 1, wherein the femtocamera and femtoprojector are spaced apart from each other and the femtocamera is located in a non-optical zone of the contact lens.

10. The eye-mounted device of claim 1, wherein the femtocamera comprises an array of light sensors and sensor electronics coupled to receive electrical sensor signals produced by the light sensors, the femtoprojector comprises an array of light emitters and drive electronics coupled to provide electrical drive signals to drive the light emitters, and the sensor electronics and drive electronics are implemented on a single die.

11. The eye-mounted device of claim 1, further comprising:
    one or more additional femtoprojectors also corresponding to the femtocamera, all of the femtoprojectors contained in the contact lens and in aggregate projecting imagery to the user's retina that corresponds to the imagery detected by the femtocamera.

12. The eye-mounted device of claim 1, wherein the femtocamera operates in a non-visible wavelength band, and the femtoprojector projects visible imagery corresponding to the non-visible imagery detected by the femtocamera.

13. The eye-mounted device of claim 1, further comprising:
    control circuitry contained in the contact lens, the control circuitry controlling the femtocamera and femtoprojector based upon eye blink commands.

14. The eye-mounted device of claim 1, wherein the femtocamera runs a calibration cycle when the user's eyelid is closed.

15. The eye-mounted device of claim 1, further comprising:
    trigger circuitry and memory both contained in the contact lens, the trigger circuitry coupled to the memory-less imagery signal paths and causing capture and storage of the imagery in the memory upon detection of a trigger on the memory-less imagery signal paths, wherein the memory is not located on the memory-less imagery signal paths; and
    a wireless transmitter for transmission of the stored imagery off the contact lens.

16. The eye-mounted device of claim 15, wherein the trigger is a pre-determined sequence of eye blinking.

17. The eye-mounted device of claim 1, further comprising image processing circuitry located along the imagery signal paths between the femtocamera and the femtoprojector.

18. The eye-mounted device of claim 17, wherein the image processing circuitry is analog circuitry.

19. The eye-mounted device of claim 17, wherein the image processing circuitry performs at least one of edge enhancement and motion detection.

20. The eye-mounted device of claim 17, wherein the femtocamera operates in a thermal infrared wavelength band, and the image processing circuitry estimates temperature based on the thermal infrared imagery detected by the femtocamera.

* * * * *